United States Patent [19]

Solomon

[11] Patent Number: 4,754,711
[45] Date of Patent: Jul. 5, 1988

[54] ADAPTABLE FRAME

[76] Inventor: Allen Solomon, 2029 E. 17th St., Brooklyn, N.Y. 11229

[21] Appl. No.: 22,505

[22] Filed: Mar. 9, 1987

Related U.S. Application Data

[63] Continuation of Ser. No. 736,746, May 22, 1985, abandoned, which is a continuation-in-part of Ser. No. 682,240, Dec. 17, 1984, Pat. No. 4,669,691.

[51] Int. Cl.⁴ .............................. A47F 5/12; B25G 3/36
[52] U.S. Cl. ........................................ 108/8; 403/385; 248/122; 211/182
[58] Field of Search .............. D17/9; 108/111, 6, 112, 108/33, 39; 248/121, 188.2, 122, 124, 125, 127, 165, 172, 149, 150, D107; 211/182; 403/385, 391, 199, 190, 237

[56] References Cited

U.S. PATENT DOCUMENTS

| | | | |
|---|---|---|---|
| D. 257,987 | 1/1981 | Schoenig | D17/9 |
| 551,256 | 12/1885 | Brown | 108/6 X |
| 870,770 | 11/1907 | Fuller | 248/188.9 |
| 2,010,855 | 8/1935 | Fuller | 108/112 X |
| 2,679,413 | 5/1954 | Johnson | 403/385 |
| 3,100,573 | 8/1963 | Cox | 211/182 X |
| 3,164,353 | 1/1965 | Rene | 108/6 X |
| 3,516,695 | 6/1970 | Lowe | 403/385 |
| 3,586,278 | 6/1971 | Simons | 248/121 X |
| 3,887,291 | 6/1975 | Langren | 403/385 X |
| 3,945,291 | 3/1976 | Zickos | 403/391 X |
| 4,443,128 | 4/1984 | Yamamoto et al. | 403/385 |

Primary Examiner—Kenneth J. Dorner
Assistant Examiner—Jose V. Chen
Attorney, Agent, or Firm—Caesar, Rivise, Bernstein, Cohen & Pokotilow, Ltd.

[57] ABSTRACT

An adaptable frame, for mounting of equipments, keyboards, displays, accessories, printed material, and other paraphernalia is disclosed. The frame contains supports having uprights and braces to which are connected crossbars. Either brackets or a shelf for holding equipment and material may be mounted on each crossbar to suit the needs of the user. The frame can easily and rapidly disassembled and assembled without tools. It disassembles into a few parts, i.e. two uprights, two braces, the crossbars with attached brackets, and shelves, for ease of transportation, handling and storage. The shelves are longitudinally hinged so that they may be folded for greater ease in handling when the frame is disassembled. The number and positioning of crossbars, brackets and shelves can be varied to meet the needs of the user. A compartmentalized carrying bag may be supplied for ease of storage and transportation.

9 Claims, 3 Drawing Sheets

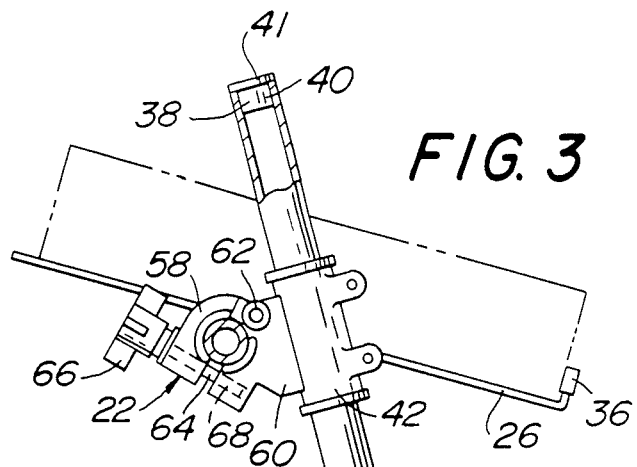
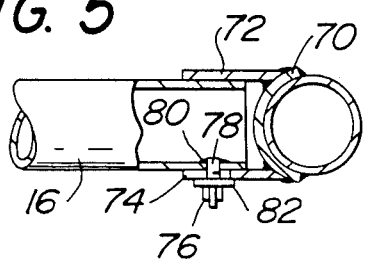
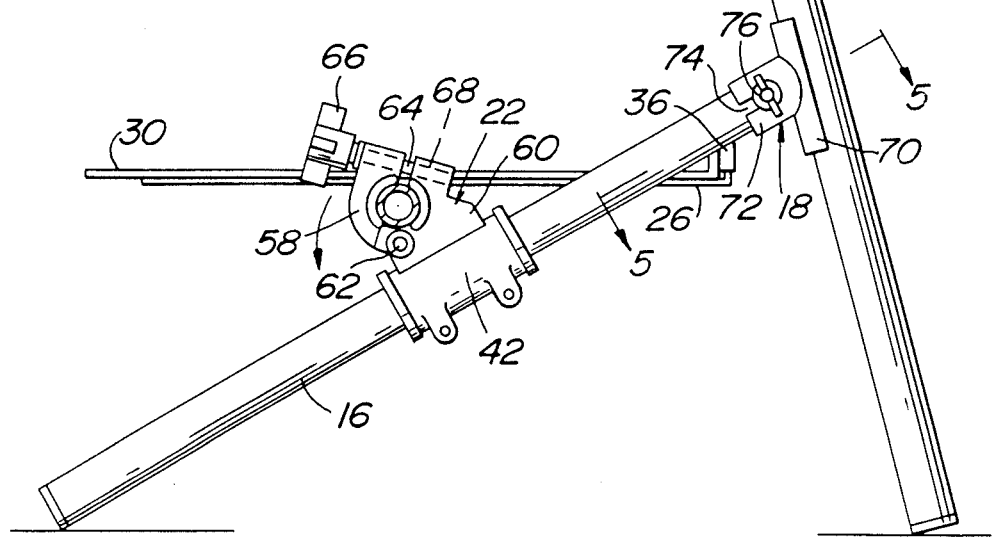

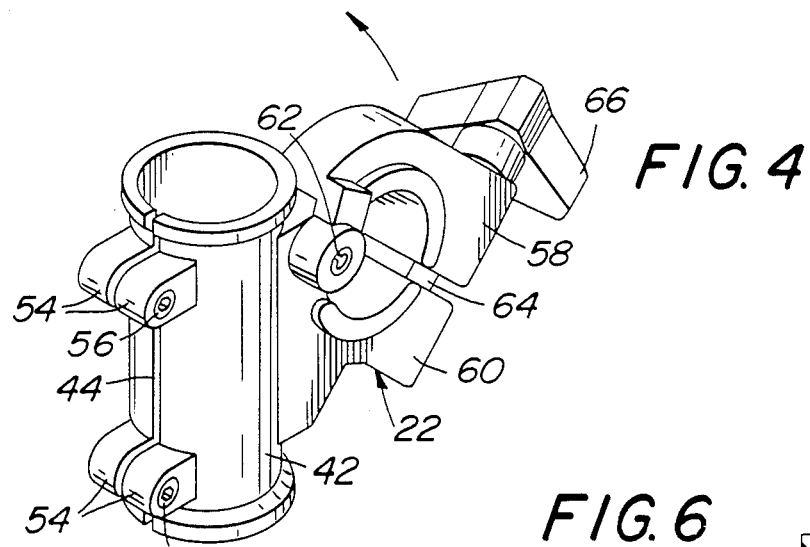
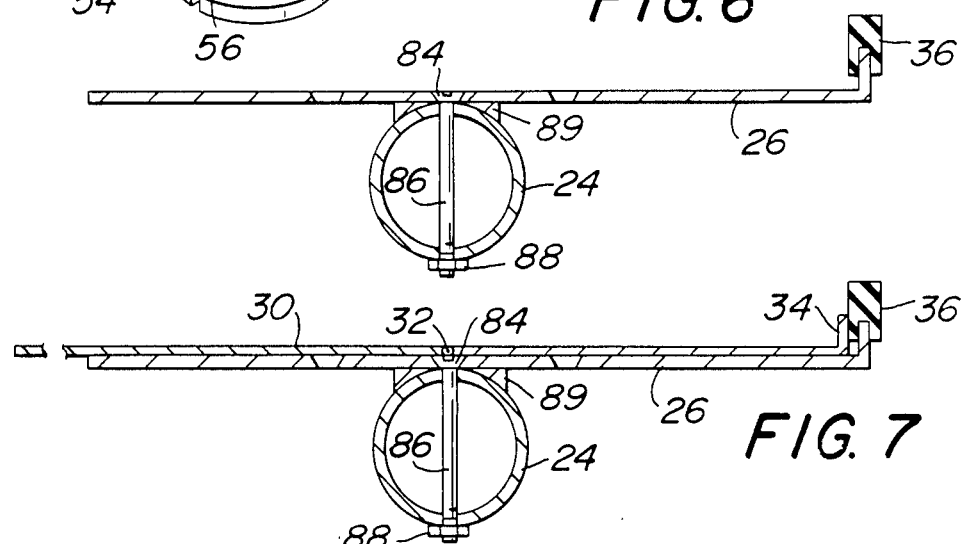
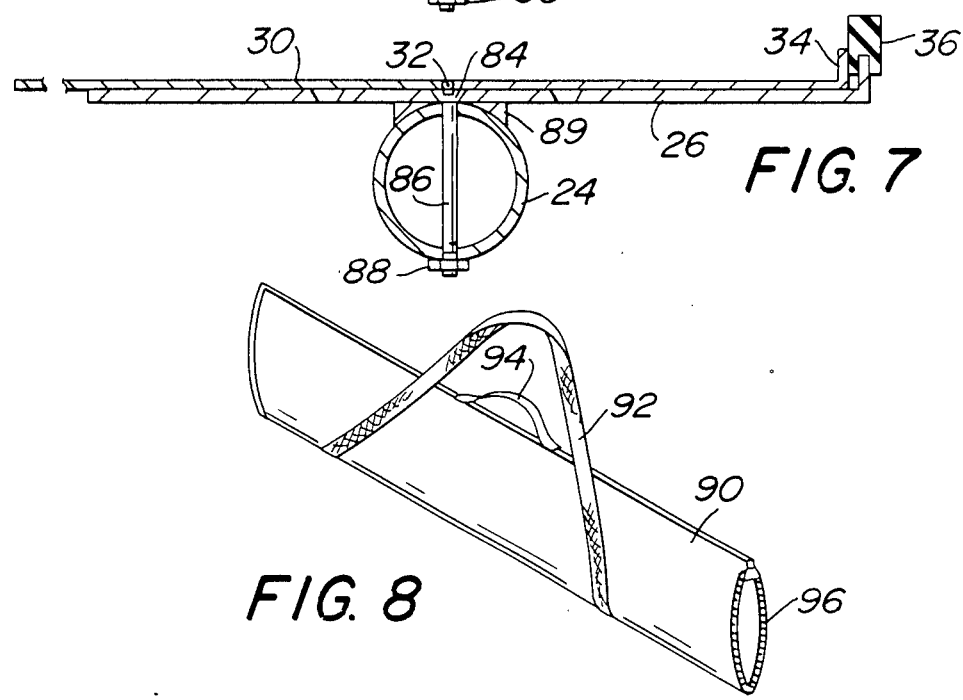

ADAPTABLE FRAME

This application is a continuation of prior filed application Ser. No. 736,746, filed May 22, 1985, now abandoned, which was a continuation-in-part application based on prior filed application Ser. No. 682,240, filed Dec. 17, 1984, now U.S. Pat. No. 4,669,691.

BACKGROUND OF THE INVENTION

This invention relates to an adaptable frame which is simple, inexpensive, flexible and sturdy, and which may easily be assembled and disassembled for storage, handling and transportation without the need for tools.

Recent years have seen a proliferation of the need for adaptable frames so that relatively heavy equipment can be moved from place to place and mounted for use rapidly and easily. Presentations and demonstrations often require the use and set up of display equipments, computers, control keyboards, TV sets, VCRs, screens, charts and the like. Musicians who travel from place to place for each performance require a means to set up and mount musical keyboards, amplifiers, and associated equipment.

Another need for adaptable frames which has grown rapidly in the past few years is to hold and store small home and business computers and their associated equipment, paraphernalia and printed material such as keyboards, printers, displays, modems, instruction books, storage discs and programs.

Previous frames that have been designed for these purposes in the past are more complex, have more parts, and are not as easily assembled and disassembled, transported, handled and stored as this invention.

Further, previously designed devices do not allow flexibility in mounting brackets to hold equipment which can be set at any desired vertical angle and also accommodate shelves when the brackets are set horizontally. They also do not allow for the addition or subtraction of shelves and brackets to accommodate changing needs in the amount of equipment, paraphernalia and printed material the frame is required to hold.

OBJECTS OF THE INVENTION

Accordingly, it is a general object of the invention to provide an adaptable frame which overcomes the disadvantages of the prior art.

It is another object of the invention to provide an adaptable frame which is flexible and accomodates various numbers and types of keyboards, equipments, paraphernalia and printed materials.

It is a further object of this invention to provide an adaptable frame for the mounting of equipment, paraphernalia and keyboards which is easily and rapidly assembled and disassembled for ease of storage, handling and transportation without the need for special tools.

It is still a further object of this invention to provide an adaptable frame for mounting equipment, keyboards and paraphernalia which is inexpensive to manufacture, and comprises a minimum number of parts.

SUMMARY OF THE INVENTION

The invention comprises an adaptable frame which has two supports, between which crossbars are clamped. The supports include uprights which are supported by braces which extend diagonally downward and back from the lower portion of the uprights. A crossbar is also placed between the two braces.

Brackets are attached to the crossbars and may be positioned at any desirable vertical angle. Equipment, keyboards or shelves may be placed on the brackets.

The crossbar heights are adjustable as the clamps which hold the crossbars may be positioned as desired on the uprights and the braces. Therefore various heights of equipment can be accomodated by placing the crossbars at required heights. Further, the brackets connected to the crossbars may be spaced at different widths to accommodate equipment of various sizes.

The frame may be assembled and disassembled into just a few parts without the use of tools. These parts are the two uprights, the two braces, each of the crossbars to which are attached the brackets, and the shelves. For further ease in transportation, handling and storage, hinges may be placed longitudinally on the shelves to enable the shelves to be folded. A compartmentalized heavy duty laminated cloth bag, into which the disassembled frame parts can be placed, may be supplied with hand and shoulder straps, for easy transportation and storage.

Other objects and many of the attendent advantages of this invention will be readily appreciated as the same becomes better understood by reference of the following detailed description when considered in connection with the accompanying drawings:

DESCRIPTION OF THE DRAWINGS

FIG. 3 is a side elevation view of the frame.

FIG. 4 is a perspective view of the clamping device used to affix the crossbar to the uprights and the braces.

FIG. 5 is a cross-sectional view of the connection means used to connect the braces to the uprights along lines 5—5 of FIG. 3.

FIG. 6 a cross-sectional view taken through the mounting bracket and crossbar along lines 6—6 of FIG. 2.

FIG. 7 a cross-sectional view taken through the mounting bracket, shelf and crossbar along line 7—7 of FIG. 2.

FIG. 8 is a three dimensional view showing a carrying bag for the adaptable frame and clamp assembly means of the present invention.

DETAILED DESCRIPTION OF THE INVENTION

Figure 1:
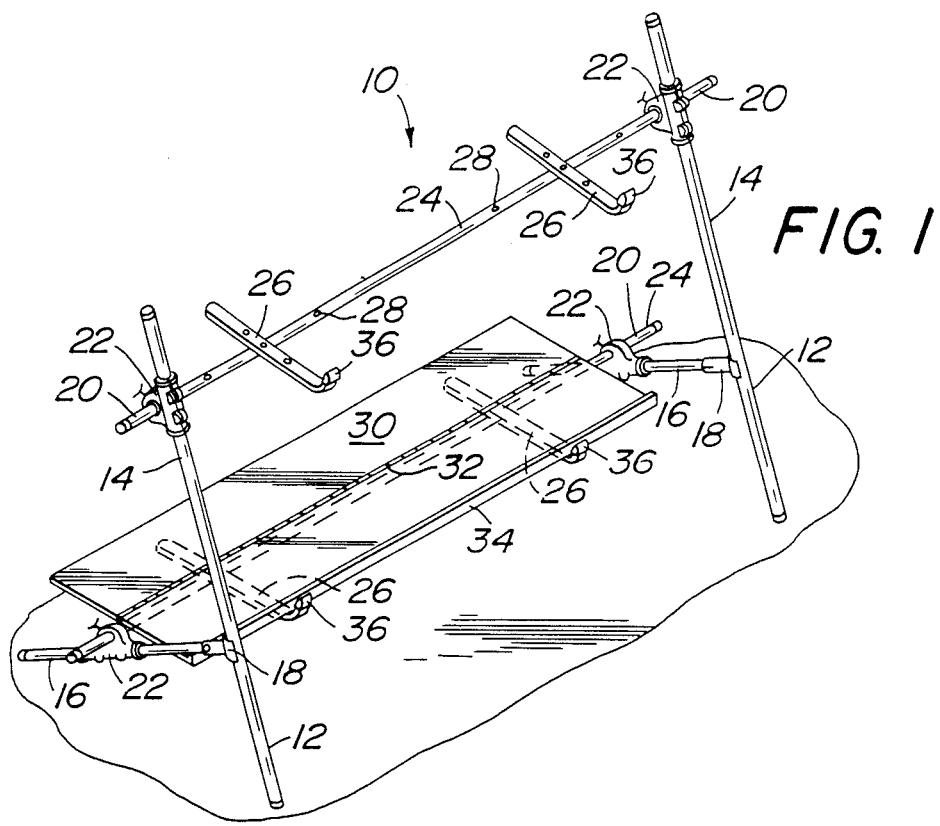
FIG. 1 is a perspective view of the frame.

Referring now to the various figures of the drawing wherein like reference characters refer to like parts, there is generally shown at 10 in FIG. 1 a self standing adaptable and easily assembled frame for mounting equipments, accessories and printed material. Left and right supports 12 comprise uprights 14 and braces 16. The braces 16 are inserted into connection means 18 which clamp and affix the braces 16 to uprights 14, so that braces 16 extend downward and backward from upright 14 to provide support to uprights 14.

Mounting assembly 20 for holding a crossbar includes clamping devices 22, crossbar 24 and brackets 26. The crossbars 24 are mounted into and gripped by clamping devices 22 as shown in the FIG. 1. The brackets are held in place by bolts inserted into holes 28 in crossbar 24 as will be described in further detail later. As can be seen in FIG. 1 the separation and positioning of the brackets may be varied by bolting the brackets 26 through the different holes 28 in crossbar 24. Thus the brackets may be positioned to accomodate equipments or paraphernalia of various sizes and widths.

FIG. 1 shows one mounting assembly 20 connected to the uprights 14 and another connected to braces 16. As can be seen additional mounting assemblies 20, as desired, may be mounted to uprights 14 or braces 16.

It is also apparent that after brackets 26 are affixed to crossbar 24, the brackets 26 may be positioned horizontally or at any vertical angle by loosening clamping devices 22 and rotating crossbar 24 to the proper position.

Shelf 30 is placed upon the lower set of mounting brackets 26 which has been positioned horizontally. Shelf 30 is not bolted or otherwise affixed to brackets 26 so that after use, the shelf may be lifted free of the remainder of the frame 10. For ease of transportation and storage, shelf 30 may be folded along hinge 32. Alternatively, the shelf may be bolted to the brackets if desired.

Lip 34, at the forward edge of shelf 30 abuts the upwardly bent forward portion of bracket 26. Protective pad 36 is placed over the end of bracket 26 so that shelf 30 and equipment may be safely and securely held by brackets 26.

Figure 2:
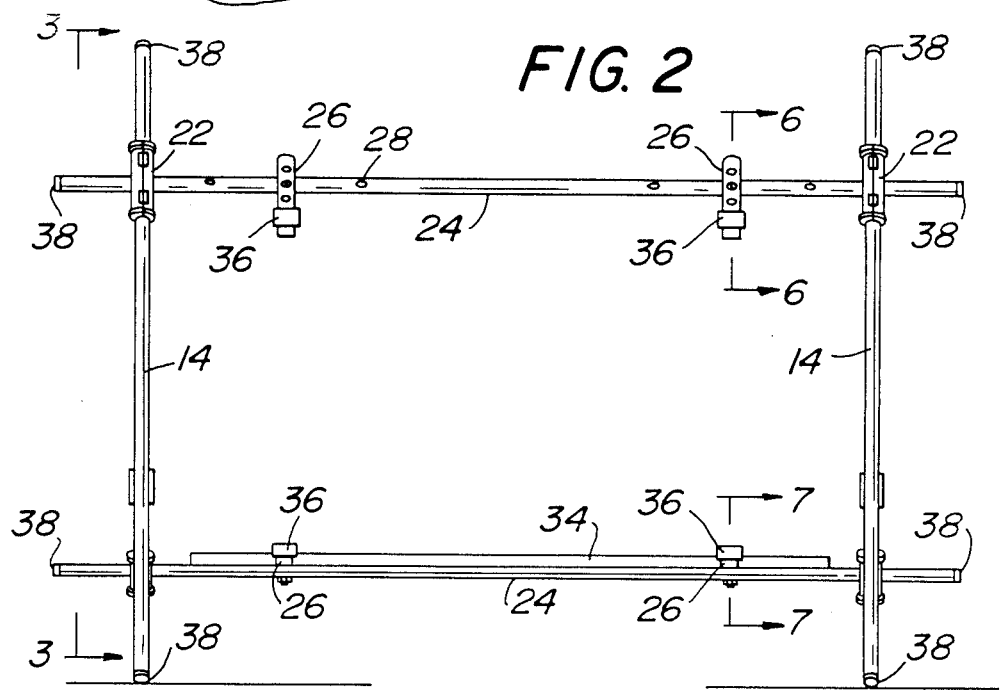
FIG. 2 is a front elevation view of the frame.

FIG. 2 is a front elevation view of frame 10. Plug-in caps 38 are inserted into the ends of forward uprights 14, crossbars 24 and braces 16.

A cut away view of the upper portion of upright 14 is shown to illustrate the seating of plug-in caps 38 at the top of FIG. 3. Plug-in cap 38 comprises cylindrically shaped lower portion 40 and upper portion 41. When plug-in cap 38 is inserted into the top of upright 14 which is a hollow cylinder, the outer surface of lower portion 40 abuts the inner surface of upright 14, while the lower surface of upper portion 41 abuts the upper surface of upright 14. Upper portion 41 has the same diameter as the outer diameter as upright 14.

Referring now to FIG. 4, the means for attachment of clamping device 22 will be described. Split collar or stationary clamping member 42 of clamping device 22 is an elongated sleeve which contains a longitudinal gap 44 so that the inner dimension of split cylinder 42 is greater than the outer dimension of upright 14 and brace 16. Therefore collar 42 may be slid over the ends of uprights 14 or braces 16 and positioned along the length of uprights 14 or braces 16 as desired.

Projections 54 on split collar 42 on both sides of gap 44 contain threaded holes 56. When clamping device 22 is positioned at its desired location split cylinder 42 is tightened about either upright 14 or brace 16 to give full bearing support on an upright over its entire length. This is accomplished by placing screws (not shown) into the threaded holes 56 of projections 54 which are shown in FIG. 4 on one side of the gap, and threading those screws into threaded holes 56 on projections 54 on the other side of gap 44. This shortens the gap and tightens split collar 42 about upright 14 or brace 16.

Clamping device 22 also has pivotable upper jaw 58 and stationary lower jaw 60 which is in the form of an acts as a stationary truss. The stationary lower jaw 60 includes a cantilever beam (unnumbered) being of varying cross-sectional area, varying from a greater cross-sectional area adjacent the sleeve where the moment force is greatest to a minimal cross-sectional area where the moment force is less. Upper jaw 58 is connected to lower jaw 60 by pivot 62. It will be seen from FIG. 4 that the lower jaw 60 extends from a cantilever truss. Therefore, upper jaw 58 may be rotated in the direction of the arrows shown in FIGS. 3 and 4 to increase the gap between upper jaw 58 and lower jaw 60 and to separate the jaws. Crossbar 24 may be placed between the jaws when they are separated.

As shown in FIG. 3, screw 64 is attached to knob 66 of upper jaw 58. Lower jaw 60 contains threaded hole 68. After crossbar 24 has been inserted between the jaws, upper jaw 58 is pivoted about pivot 62 in the direction opposite to the arrows shown in FIGS. 3 and 4 to bring screw 64 into contact with threaded hole 68. Rotation of knob 66 causes screw 64 to thread into threaded hole 68 closing the gap between upper jaw 58 and lower 60, and clamping crossbar 24. Upper jaw 58 and lower jaw 60 are semi-toroidal in shape so that when clamping device 22 is tightened the jaws fit tightly about the cylindrical cross bar and the lower jaw forms a ledge to support the crossbar.

As shown in FIG. 3 connection means 18 comprises rear plate 70 which is shaped to longitudinally abut with and be permanently attached to upright 14. Cup 72 is permanently attached to rear plate 70 and is angled rearward and downward to accept brace 16. Slot 74 is cut into the side of cup 72. A threaded hole in brace 16 accepts a threaded shaft (see FIG. 5) attached to tightener 76. When brace 16 is inserted into cup 72 the threaded shaft of tightener 76 is accepted into slot 74.

FIG. 5 shows an enlarged cross-sectional view of brace 16 inserted into and clamped by connection means 18 taken along lines 5—5 of FIG. 3. As can been seen in FIG. 5 rotation of tightener 76 inserts threaded shaft 78 further into threaded hole 80 so that washer 82 beneath tightener 76 is pressed against the side of cup 72 thereby clamping brace 18 in place.

FIG. 6 is a cross-sectional view through bracket 26 taken along the lines 6—6 of FIG. 2. As shown in FIG. 6, bracket 26 contains counter sunk hole 84 through which bolt 86 is inserted. Bolt 86 extends through holes in cross bar 24 and is threaded into nut 88. Tightening of bolt 86 firmly affixes bracket 26 to cross bar 24. Plastic washer 89 is placed between bracket 26 and crossbar 24. The lower portion of washer 89 is curved to conform to the shape of crossbar 24 while the upper portion upon which bracket 26 is placed is flat.

Plastic washer 89 performs two functions. It increases the load bearing surface of the connection between bracket 26 and crossbar 24 and it facilitates the rotation of brackets 26 from a position perpendicular to crossbar 24 when frame 10 is in use, to a position parallel to crossbar 24 for ease of transportation and storage when frame 10 is not in use, as will be explained later.

FIG. 7 shows a cross-section of bracket 26, crossbar 24 and shelf 34 taken along lines 7—7 of FIG. 2. As descried above bolt 86 is inserted into countersunk hole 84 and threaded into nut 88 to secure shelf 26 to crossbar 24. Plastic washer 89 is placed between bracket 26 and crossbar 24. Shelf 30 rests freely on bracket 26 with lip 34 of the shelf in contact with and abuting protective pad 36. Therefore, upon disassembly, shelf 30 may be removed from bracket 26 and folded along hinge 32 for ease of transportation and storage.

The ease of assembly and disassembly, transportation and storage of the frame will now be described. Upon initial assembly braces 16 are connected to uprights 14 by insertion into connection means 18 and secured by rotation of tightener 76. Clamping means 22 are then slid on to uprights 14 and braces 16 and positioned where desired. The clamping means 22 are secured by screws inserted into threaded holes in projections 54.

Crossbars are inserted between jaws 58 and 60 of clamping means 22. It should be noted that as many crossbars as desired may be mounted on braces 16 and uprights 14, by adding pairs of clamping means 42 positioned where desired on braces 16 and uprights 14 to meet the needs of the user.

Brackets 26 are then connected to crossbars 24 by insertion of bolts 86 which are threaded into nuts 88. Hand tools are required during initial assembly only to secure bolts 86 and to secure clamping means 22. No special tools are required for subsequent disassembly and reassembly.

Crossbars 24 are then rotated to position brackets 26 horizontally for shelf mounting or at any desired angle for holding equipments and/or keyboards. Crossbars 24 are then clamped into position by rotating upper jaw 58 about pivot 52 to place upper jaw 58 in close proximity to lower jaw 60. Knob 66 is then rotated to thread shaft 64 (see FIG. 3) into threaded hole 68 to tightly clamp crossbar 24.

Disassembly and reassembly can be done rapidly and easily without the need for any tools. Disassembly requires only lifting of shelf 30 off bracket 26 and folding shelf 30 about hinge 32. Knobs 66 are then rotated to loosen clamps 22 so that crossbars 24 may be lifted away from clamps 22. Brackets 26 are then rotated about the axis of its connection point to crossbar 24 so that brackets 26 are longitudinally parallel to crossbar 24. Tightener 76 is then loosened to allow removal of braces 16.

The disassembled parts of frame 10 are crossbars 24 to which are attached brackets 26, uprights 14 to which are attached connection means 18 and clamping devices 22, braces 16 to which are attached clamping devices 22, and folded shelf 30.

Reassembly of the device 10 also requires no hand tools and is essentially the reverse of the disassembly procedure described above. Braces 16 are inserted into connection means 18 and clamped to uprights 14 by rotation of tightener 76. Upper jaws 58 of clamping devices 22 are separated from lower jaws 60 by pivoting about pivot 62. Crossbars 24 are inserted into clamping devices 22. Brackets 26 are rotated about their connection points with crossbar 24 so that brackets 26 are perpendicular to crossbar 24.

Crossbars 24 are rotated to set brackets 26 to their desired vertical angles. Upper jaw 58 is rotated about pivot 62 to bring it into close proximity with lower jaw 60, and knob 66 is rotated to clamp crossbar 24 between jaws 58 and 60. Shelf 30 is opened about hinge 32 and placed upon brackets 26 with lip 34 in contact with protective pad 36 of brackets 26.

The entire reassembly or disassembly of the frame including mounting or dismounting of the equipment, keyboards and paraphernalia requires 5 minutes or less in time.

A carrying and storage bag 90 may be supplied to hold the disassembled parts of flexible frame 10 for ease of transportation and storage. Referring to FIG. 8, carrying bag 90 is made of heavy laminated cloth or plastic material. It includes shoulder strap 92 and hand strap 94. One end of carrying bag 90 contains zipper 96 so that after the parts have been placed in carrying bag 90 the bag may be closed. Carrying bag 90 may be internally compartmentalized, similar to a golf bag, so that the various parts of disassembled frame 10 may be placed into their associated compartments.

Without further elaboration the foregoing will so fully illustrate my invention that others may, by applying current or future knowledge, readily adapt the same for use under various conditions of service.

What is claimed is:

1. An adaptable frame for holding relatively heavy equipments, keyboards, and paraphernalia, said frame comprising left and right supports, at least one pair of mounting assemblies attached to said supports for holding a crossbar, each of said supports comprising a floor engaging upright that extends in a generally vertical direction, said mounting assemblies comprising clamping devices adjustably attached to said upright, said clamping devices each comprising a clamping member adjustably secured to said upright, said clamping member comprising an elongated tubular sleeve with full bearing support on one of said uprights about the circumference of the upright and over the entire length of the sleeve and adapted to be fixedly but removably held in a given position on one of said uprights to resist moment forces, said clamping member being one piece with a cantilever beam and a stationary jaw member, said beam being of varying cross-sectional area, varying from a greater cross-sectional area adjacent said sleeve where moment force is greatest to a minimal cross-sectional area where moment force is less, said clamping member also including a movable jaw member mounted for pivotal movement relative to said stationary jaw member and a bolt member, said bolt member being independent of said clamping member and secured to said clamping device and adapted to prevent movement of said movable jaw member relative to said stationary jaw member, one of said jar members forming a cantilevered ledge to support said crossbar, a crossbar held by said clamping device, and mounting brackets attached to said crossbar, each of said brackets having an upwardly bent forward section for holding equipments, keyboards and paraphernalia, so that by turning said crossbars, said brackets may be positioned horizontally for holding said equipments, keyboards or paraphernalia.

2. The frame as defined in claim 1 wherein said brackets are attached to said crossbars by bolts inserted through holes in said brackets and said crossbars, with a washer placed between said brackets and said crossbars, said washer having a lower portion shaped to conform with the shape of said bars and flat upper portion which abuts the bottom surface of said bracket.

3. The frame as defined in claim 2 wherein said crossbars contain a plurality of holes so that said brackets can be variously positioned and spaced to accommodate equipments, keyboards and paraphernalia of different sizes and widths.

4. The frame as defined in claim 1 wherein said tightener and clamping device are operated manually to preclude the need for tools for disassembly and reassembly, of said frame.

5. The frame as defined in claim 4 wherein each of said clamping devices comprises a split collar, a lower jaw, an upper jaw connected to said lower jaw by a pivot, a knob connected to said upper jaw, a screw connected to said knob and extending through and beyond said upper jaw, and a threaded hole in said lower jaw, so that when said upper jaw is pivoted away from said lower jaw said crossbar may be placed between said jaws, and when said upper jaw is pivoted towards that lower jaw, rotation of said knob will thread said threaded shaft into said threaded hole clamping said crossbar between said jaws; said split collar having an elongated gap, projections on both sides of said gap, and threaded holes in said projections so that said collar may be slipped onto said upright, positioned along said upright, and clamped at said position by screws inserted into said threaded holes and rotated to narrow said gap.

6. The frame as defined in claim 1 wherein said upwardly bent forward section of said mounting brackets are covered with protective pads.

7. Clamp assembly means for a stationary strut, comprising clamping member adjustably secured to said strut, said clamping member comprising an elongated tubular sleeve with full bearing support on said strut about the circumference of said upright over the entire length of the sleeve and adapted to be fixedly but removably held in a given position on said strut to resist moment forces, said clamping member being one piece with a cantilever beam and a stationary jaw member, said beam being of varying cross-sectional area, varying from a greater cross-sectional area adjacent said sleeve where moment force is greater to a minimal cross-sectional area where moment force is less, said clamping member also including a movable jaw member mounted for pivotal movement relative to said stationary jaw member and a bolt member, said bolt member being independent of said clamping member and secured to said clamping device and adapted to prevent movement of said movable jar member relative to said stationary jaw member, one of said jaw members forming a cantilevered ledge to support said strut.

8. The clamp assembly means of claim 7 wherein said sleeve, said stationary jaw member and said cantilever beam are formed of one piece plastic.

9. The clamp assembly means of claim 7 wherein said clamping means comprises a threaded bolt with a plastic head for tightening and loosening by hand, said bolt being removably threaded into and through said movable jaw, and a threaded hole in said stationary jaw member for receiving said threaded bolt, so that then said strut is inserted between said jaws and said bolt is threaded into said threaded hole, said strut is clamped between said jaws, and when said bolt is removed from said threaded hole, said bolt is held captive by removable jaw unless said bolt is unthreaded from said movable jaw.

* * * * *